United States Patent
Sandquist et al.

(10) Patent No.: US 6,228,214 B1
(45) Date of Patent: May 8, 2001

(54) METHOD FOR BLACK LIQUOR GASIFICATION IN RECOVERY BOILERS

(75) Inventors: Kent K Sandquist, Askim; Anders Kullendorff, Göteborg, both of (SE)

(73) Assignee: AGA AB, Lidingo (SE)

( * ) Notice: Subject to any disclaimer, the term of this patent is extended or adjusted under 35 U.S.C. 154(b) by 0 days.

(21) Appl. No.: 09/417,171

(22) Filed: Oct. 12, 1999

Related U.S. Application Data

(63) Continuation-in-part of application No. PCT/EP98/06652, filed on Oct. 15, 1998.

(30) Foreign Application Priority Data

Oct. 15, 1997 (SE) .................................................... 9703769
Feb. 12, 1999 (SE) .................................................... 9903413

(51) Int. Cl.[7] .................................................. D21C 11/12
(52) U.S. Cl. ........................ 162/30.1; 162/30.11; 162/31; 110/238; 423/207
(58) Field of Search ............................... 162/30.1, 30.11, 162/31; 110/238, 214, 345, 348; 422/185; 423/207, DIG. 9

(56) References Cited

U.S. PATENT DOCUMENTS 4,823,710    4/1989   Garrido et al. .
4,857,282    8/1989   Mullen ................................. 423/207
5,683,550   11/1997   Ryham ................................. 162/30.1
5,992,337  * 11/1999  Philippe et al. ....................... 110/348

FOREIGN PATENT DOCUMENTS

WO 92/21815     12/1992  (WO).
WO 9605366A1    2/1996   (WO).

* cited by examiner

Primary Examiner—Dean T. Nguyen
(74) Attorney, Agent, or Firm—Pearne & Gordon LLP

(57) ABSTRACT

The invention refers to a method for black liquor gasification in recovery boilers, of the type having a lower portion, referred to as a lower furnace and an upper portion, referred to as an upper furnace, black liquor sprayers for introduction of black liquor provided in the boiler above the lower furnace, and a number of combustion air levels, whereby the invention incorporates adding oxygen enriched air to the combustion air or directly into the lower furnace at at least one air level underneath the liquor sprayers for the purpose of creating the best possible reducing conditions in the lower furnace, redistributing from the lower furnace combustion air not needed therein following the addition of oxygen enriched air, thereby significantly reducing upward gas velocity underneath the black liquor sprayers, and introducing the redistributed combustion air in the upper furnace, thereby creating the reducing conditions and a controlled temperature in the lower furnace for emission control.

11 Claims, 5 Drawing Sheets

METHOD FOR BLACK LIQUOR GASIFICATION IN RECOVERY BOILERS

The present application is a continuation-in-part of prior-filed, copending International Application, PCT/EP98/06652, filed Oct. 15, 1998.

The present invention refers to a method for black liquor gasification in recovery boilers utilizing oxygen enriched air.

BACKGROUND OF THE INVENTION

The production of chemical wood pulp is divided in two areas, i.e. the fibre line area where the chemical pulp is produced with waste liquor as a byproduct and the chemical recovery area, where chemicals needed in the fibre line area is recovered from the waste liquor. The single most expensive piece of equipment in the whole pulp mill is the chemical recovery boiler and the total pulp production capacity is heavily dependent on the capacity and availability of the recovery boiler. If the recovery boiler becomes the bottleneck in the mill, it will have a direct impact on the ability of the mill to increase the pulp production capacity.

The recovery boiler reaches its capacity limitations when heating surfaces are plugged because of "carry-over" of physical particles from the lower part of the combustion chamber. The amount of carry-over depends on four parameters; the upward gas velocity, the particle (droplet) size, particle density, and the number of particles with unfavorable properties. When the capacity increases more air is needed, and this will increase the upward gas velocity. Higher capacity also increases the number of unfavorable particles and the combined effect is that carry-over increases with increasing load. The boiler has reached its capacity limit when the boiler becomes plugged because of carry-over and the mill is unable to produce more pulp unless a huge investment is done in a new recovery boiler or a costly retrofit of the existing boiler, which also requires a long outage for installation and additional production losses and loss of revenue as a consequence.

Already in 1982 it was shown practically, e.g. by the paper "Tillsats av syrgas vid förbränning av sulfittjocklut vid MoDomsjösulfitfabrik, S. Larsson, AGA, C. Nilsson, MoDo, L. Saltin, AGA, Svenska Sodahuskonferensen, Stockholm, Sweden, Nov. 18, 1982" and by the brochure "Oxygen Enrichment increases Capacity, AGA AB, GM164e (1983)", that by enriching primary and secondary combustion air with oxygen enriched air up to 23% (by volume) oxygen content, the capacity of a sodium sulfite recovery boiler could be raised significantly.

U.S. Pat. No. 4,857,282, disclosed in 1988 a way to process black liquor by enriching the primary and/or secondary normal process air levels used in the combustion process by addition of pure oxygen in the amount of 0.63 kg/kg ds and by addition of 0.42 kg of oxygen from air/kg ds (dry solids), for the combustion of one kg of incremental dry solids, which means a total oxygen content of 21.8% by volume if the additional oxygen is evenly distributed to the air streams or in the extreme case if all the additional oxygen is added to only one of the two air streams up to an effective amount of 5% oxygen by volume to said air stream the absolute oxygen content of said airstream will raise to 24.8% if the split between primary air/secondary air is reduced to 23/77% (of volume) of total air supplied. This patent states that the incineration rate or capacity of the recovery boiler can be increased by a moderate supply of oxygen to the primary and/or secondary air stream in three ways; 1. An increase in the adiabatic flame temperature which will increase the heat flux in the lower furnace and 2. An increase in the char burning rate since the char burning rate is a linear function of oxygen concentration, and 3. Increase in the drying rate by an increased lower furnace temperature.

This is basically a subset of the results from a recovery boiler experienced 6 years earlier and reported in the two first mentioned publications.

The drawback with both these known methods is that by enriching combustion air with oxygen enriched air in the lower furnace, i.e. primary and secondary air registers without reducing the air factor (the air factor is defined as the actual oxygen supply divided by the stoichiometric supply of oxygen for complete combustion) the conditions for NOx formation will increase because of higher temperature and increased volume where there is oxidizing conditions in the lower furnace. NOx emission will now be the limiting capacity factor due to the strict environmental regulations. The first two publications describe some theoretical calculations showing that by redistributing the oxygen between the air registers, the temperature can be controlled. The flexibility of these boilers from the 80's was very limited due to air registers located in the lower furnace underneath the liquor sprayers and the air factor was normally above 1 at the liquor gun elevation (i.e. stoichiometric or above) regardless how the oxygen was redistributed between the registers.

Today the recovery boilers are using "plain" air to achieve a total air factor of 1–1.05 entering the superheater section and substoichiometric conditions in the lower furnace by the addition of air levels in the upper furnace, so called overfire air registers or tertiary, quarternary etc. air registers. This is schematically illustrated in the accompanying FIG. 1. Today the common practice is to redistribute combustion "plain" air from the lower furnace to the upper furnace in order to maintain a NOx level within regulatory limitations. This can be done because the quality of the liquor as a fuel has improved. The liquor dryness has increased substantially in the past 10 years, which means that the "as fired" heating value has gone up, which facilitates the redistribution of "plain" combustion air to this new upper furnace air levels.

The purpose of the present invention is to provide a method combining in a new manner the positive effects achieved with the oxygen enriched air in accordance with the above two first mentioned publications with the advantages of the modern recovery boiler design of today in order to further reduce the air factor in the lower furnace, to maximize the capacity and to minimize emissions, and this has been achieved in accordance with the contents of the attached claim 1.

BRIEF DESCRIPTION OF THE INVENTION

One of the basic principles of the invention is to replace some of the combustion air with oxygen enriched air. The term oxygen enriched air in this context is defined as air having an elevated oxygen content, as compared to normal air, and which is obtained by addition of appropriate proportions of technical oxygen, which is normally produced at a purity of 90–95%. By doing so a significant amount of the gas volume can be reduced since the nitrogen part in air is no longer supplied to the boiler. This reduction in gas volume can be utilized to burn more black liquor.

Another principle is to make as much as possible of this reduction in gas volume in the lower furnace, from where the carry-over originates. The lower furnace in this context is defined as the part of the furnace situated underneath the liquor sprayers and "plain" air is being defined as normal combustion air with an oxygen content of 20.95% by volume. When the gas volume decreases underneath, where the liquor is being supplied, the upward velocity decreases which is the main contributing factor to the carry-over and pluggage of the boiler. (When this velocity limit has been established by using "plain air" it can be used as a rough reference point how much more liquor can be burnt to basically maintain the same upward velocity when air is being replaced by pure oxygen. The reason for saying a rough reference is that the upward velocity is not the only parameter being affected when oxygen enriched air is being introduced. Also the swelling of the black liquor droplets, the density of the droplets, the drying and combustion rate will be affected and which all has an impact on the characteristics for if the droplet will be "carried-over" or not.) To further reduce the velocities of the gas entering the superheater and other heating surfaces and to minimize the risk of impingement and pluggage of the carry-over particles, which still exists in the gas, a partial replacement of air in the upper furnace with oxygen enriched air can also be done, but not to the same extent as in the lower furnace.

This additional reduction in flue gas volume (velocity) will also improve the inlet condition to the electrostatic precipitator as well since a reduced velocity and increased moisture content (as a consequence of reduced ballast) will improve the collection efficiency of the precipitator, and hopefully avoid that the precipitator becomes the bottleneck if more capacity is added to the boiler.

A third principle is to basically maintain the same temperature in the lower furnace to where it was by using "plain air". By doing so the capacity can be increased even more while minimizing emissions, especially NOx. When replacing air with oxygen enriched air in the lower furnace the adiabatic and consequently the actual combustion temperature would increase since less ballast (deadload) is present in the form of cold nitrogen gas, which otherwise would need energy for heating to the combustion temperature. This temperature increase would favor the non-preferred reaction of ammonia gas with oxygen to form NO. Because of the fact that less energy is needed in the lower furnace, when the deadload (in the form of nitrogen) is reduced, oxygen from air, which otherwise would be needed for combustion, can be withdrawn from the lower furnace and be supplied in the upper furnace, an even more staged substoichiometric combustion can be achieved for balancing the stoichiometric need of oxygen for complete combustion. The more oxygen enriched air is added the more air can be withdrawn. The lower furnace should only be supplied with sufficient oxygen to gasify the black liquor while the remaining oxygen should be supplied in the upper furnace with a subsequent complete combustion of the combustible components in the product gas generated in the lower furnace. This super reduction of the air factor and substoichiometric conditions in the lower furnace will suppress a temperature increase and further enhance the invention, since the gas volume and upward velocities will be reduced even more compared to just enriching the air with oxygen. This additional reduction in upward velocities will allow for more black liquor to be burnt. This new way of operating a recovery boiler will allow for substantially higher production while maintaining low emission levels.

The lower limit for the air factor is decided by the need for sustaining gasification of the liquor without the need of any auxiliary fuel and to avoid blackouts and maintain a high reduction efficiency of the smelt, but in principle in spite of the fact that more fuel (liquor) is being added to the furnace in an oxygen enriched environment the temperature in the lower furnace should be controlled to about the same temperature as without adding oxygen to the air. This can be achieved by raising the oxygen content underneath the liquor sprayers, while lowering the air factor and the higher the oxygen content is the less inert gas or ballast (deadload) present which allows for a lower air factor and more substoichiometric conditions and more air withdrawn and a higher capacity is achievable. The upper limit will be determined by economic factors, safety aspects on oxygen handling and other capacity limiting factors of the boiler, such things as steam/water limitation, e.g. circulation ratio. A practical upper limit has been defined to about 30% by volume oxygen content as an average of the combustion air in the lower furnace on existing recovery boilers and for new boilers a practical upper limit is about 50% oxygen content by volume. The reason for the higher value at new boilers is that circulation conduits, boiler configuration, air systems etcetera, can be designed for that condition from the beginning.

What is achieved with the method defined in claim 1 in the present invention is that a reducing environment with a lower air factor, without causing the temperature to increase.

This is obtained in that oxygen is added and a portion of the more cooling air, which contains only 21% oxygen and 79% nitrogen ballast, is moved to the region above the liquor sprayers.

The velocity of the gas from the bottom zone hereby is reduced for a given load. Hereby it is first obtained, that the black liquor firing can be increased, i.e. the load can be increased substantially. A consequence thereof is that a better NOx performance is also obtained. If a corresponding load increase should be achieved only by using air this should result in such a velocity increase of the gases, that such process problems, which are difficult to master, should arise due to carry-over of black liquor droplets.

The improved reducing environment under the liquor sprayers thus is achieved by addition of oxygen at the same time as the air factor is lowered. This means that a lower portion of nitrogen has to be heated to the temperature in question. Hereby the conditions in the lower furnace will be considerably more reducing, i.e. the generation of combustible gases increases, which i.a. leads to a reduction of the NOx production. Today a typical recovery boiler has an air factor of 0.8–0.9 at a level just below the liquor sprayers. With the technique according to the present invention it is possible that the air factor can be at a substantially lower level, i.e. about 0.5–0.7, which means a substantially more reducing environment, i.e. more gasification. The final burning is then effected above the liquor sprayers at a more normal air factor of about 1.05 in a conventional manner with one or more air registers.

This final combustion in one or more stages at levels above the liquor sprayers has nothing to do with the conditions in the lower furnace, beside the fact that gases generated therein shall be burned.

BRIEF DESCRIPTION OF THE DRAWINGS

FIG. 2 of the enclosed drawings shows schematically the effect on potential increase in boiler capacity and increase in adiabatic combustion temperature at various oxygen levels defined as constant upward gas velocities underneath the liquor sprayers, i.e. the boiler load has been increased while reducing the ballast to the point where the upward gas velocities are kept constant but without compensating for an increasing temperature.

In FIG. 2 is shown schematically a scenario which could very well be practiced if there where no restrictions on NOx emissions and/or dust emissions or if emissions could be controlled in any other manner. The only drawback would be a higher oxygen consumption as compared to the above described method with super staged gasification.

In FIG. 3 is schematically illustrated the effect of potential increase in boiler capacity at constant upward gas velocities, i.e. the boiler load has been increased while reducing the ballast through 1) oxygen enrichment of combustion air and 2) withdrawal of air from the lower furnace and adding it to the upper furnace in order to suppress a temperature increase to the point where the upward gas velocity is kept constant.

An operating mode referred to as Super Staged Gasification should be employed when extra capacity is needed while keeping emission levels below regulatory requirements and where minimizing the extra oxygen enriched air supply need is of interest.

A third operating scenario could be a combination of the two above mentioned, where for some reason the recovery boiler needs to be operated at a higher temperature level at the lower furnace without jeopardizing the operating permit emission levels and where it is worthwhile to pay the extra premium for oxygen consumption to achieve this higher temperature level.

Figure 1:
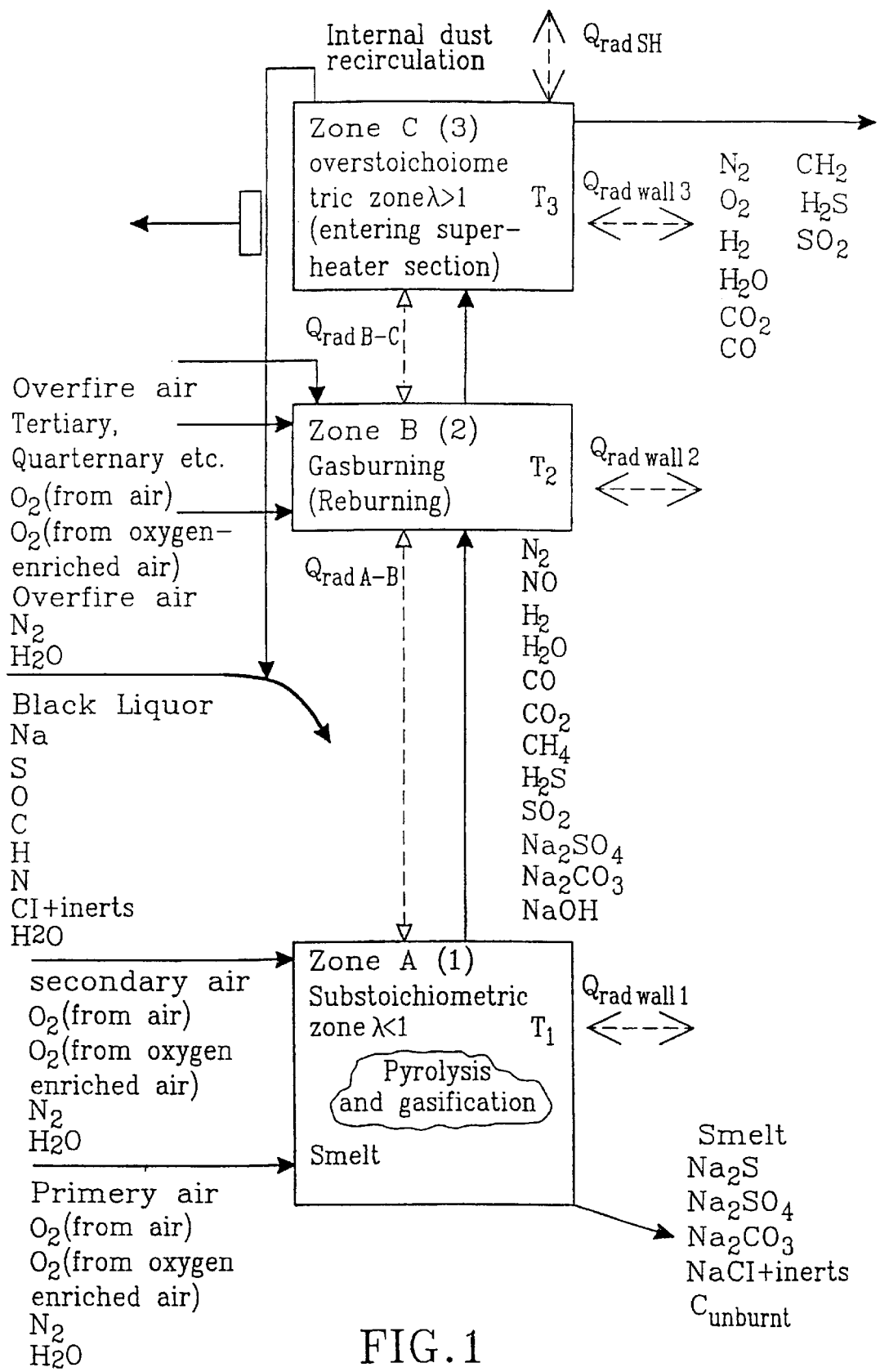
FIG. 1 is a schematic representation of an existing recovery furnace operating conditions.
Figure 2:
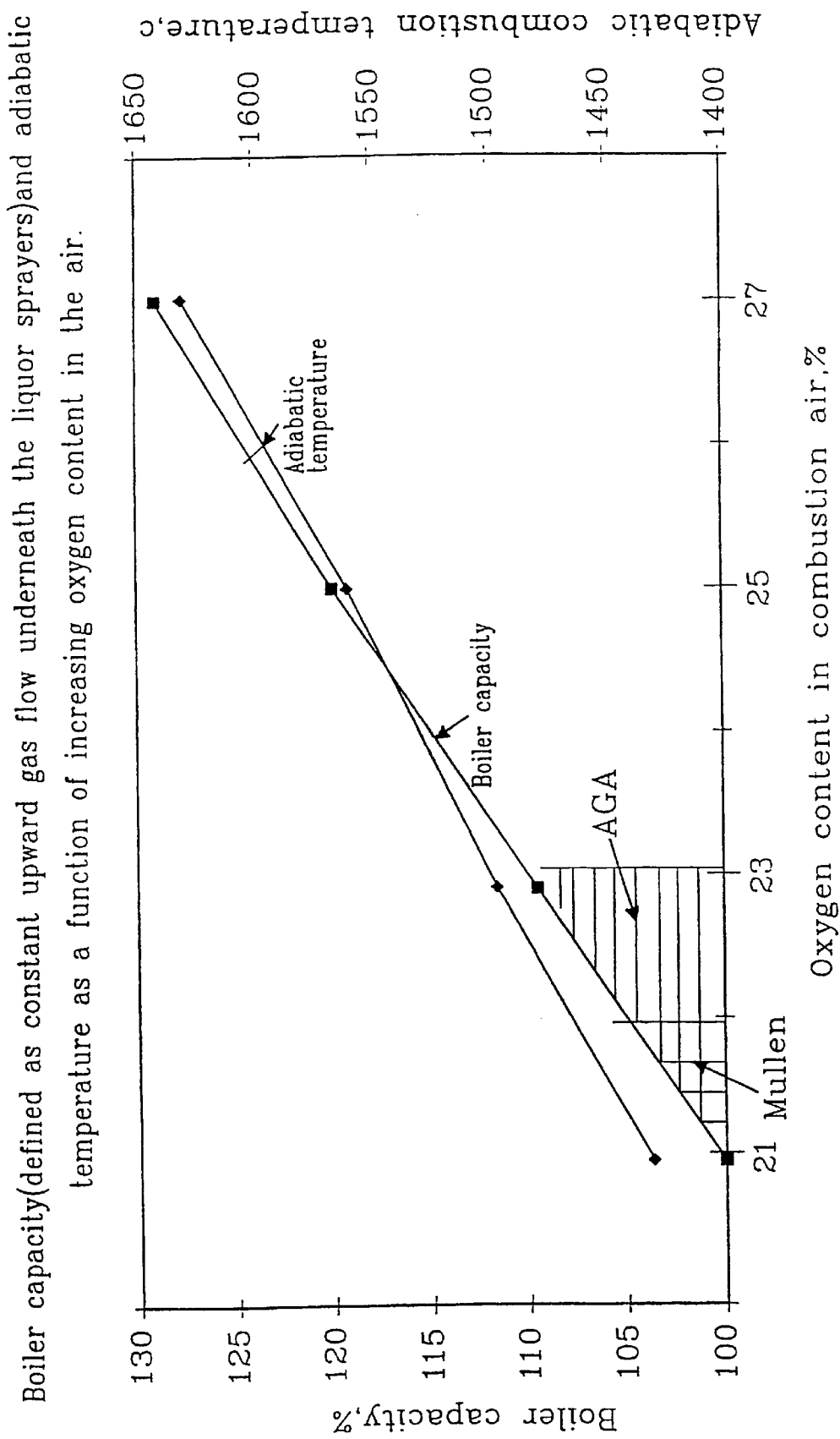
FIG. 2 is a plot of boiler capacity and adiabatic temperature as a function of increasing oxygen content in combustion air.
Figure 3:
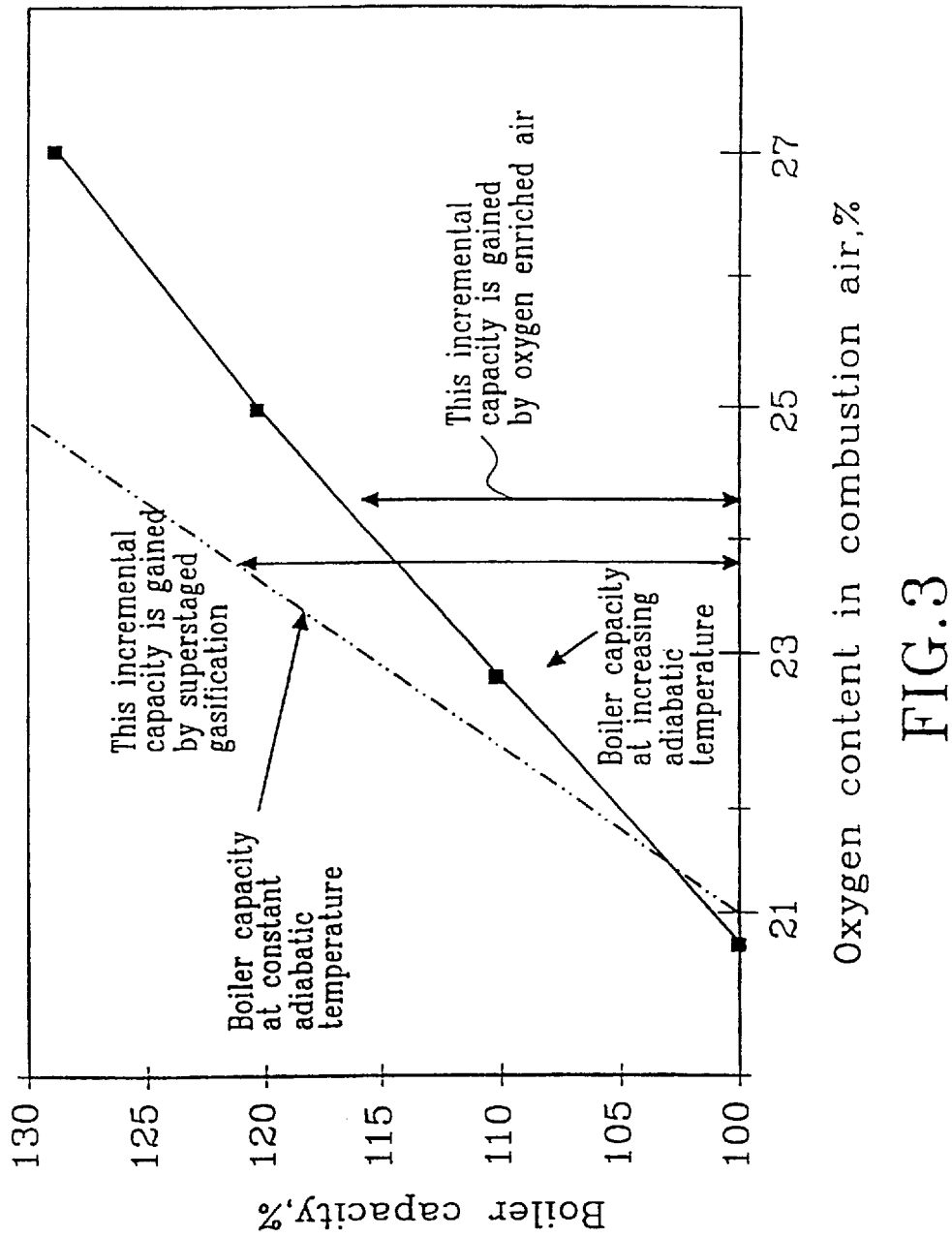
FIG. 3 is a plot of boiler capacity and temperature as a function of increasing oxygen content in combustion air.
Figure 4:
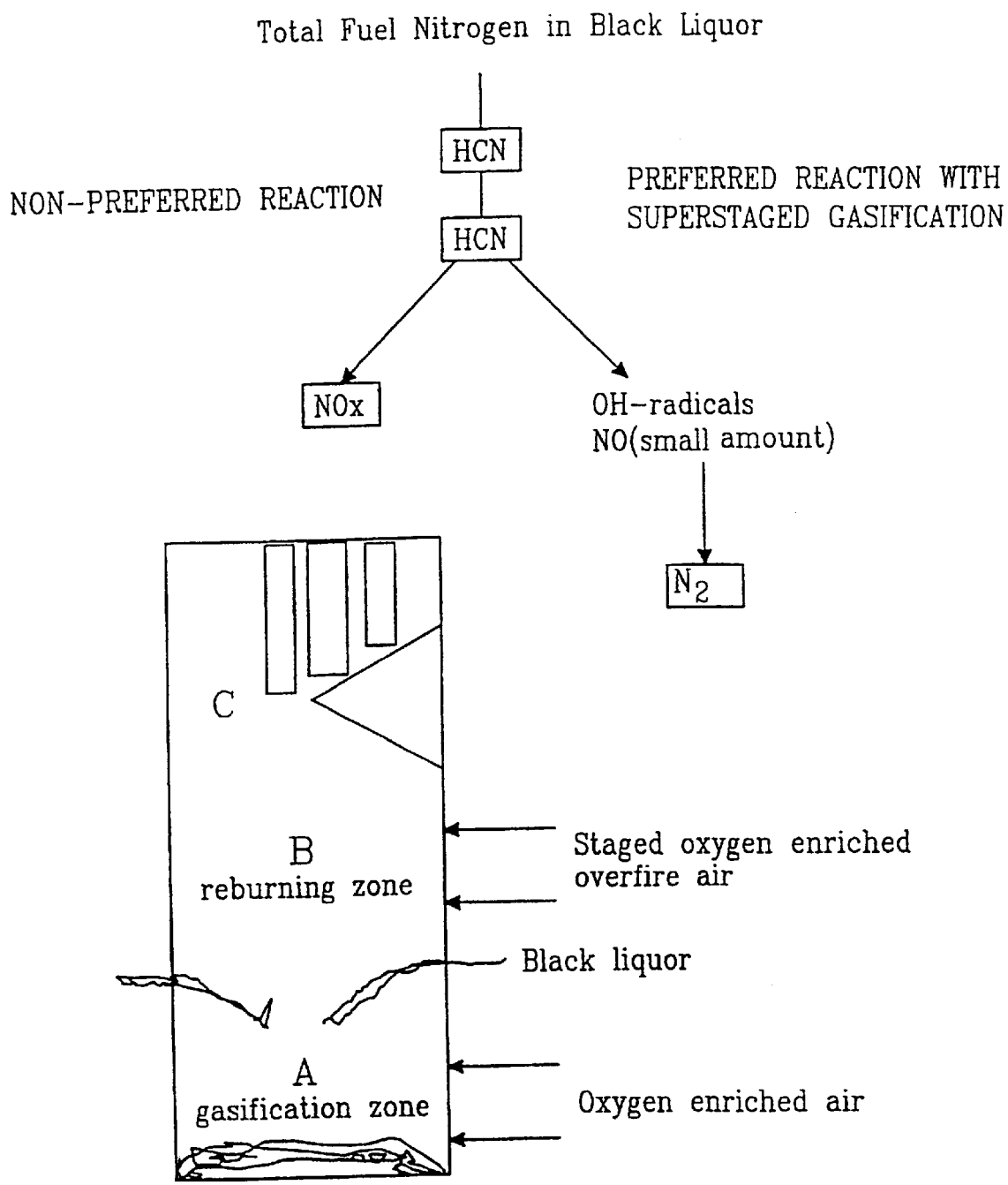
FIG. 4 is a schematic representation of total fuel nitrogen in black liquor gasification and FIG. 5 is a plot of various furnace condition.
Figure 5:
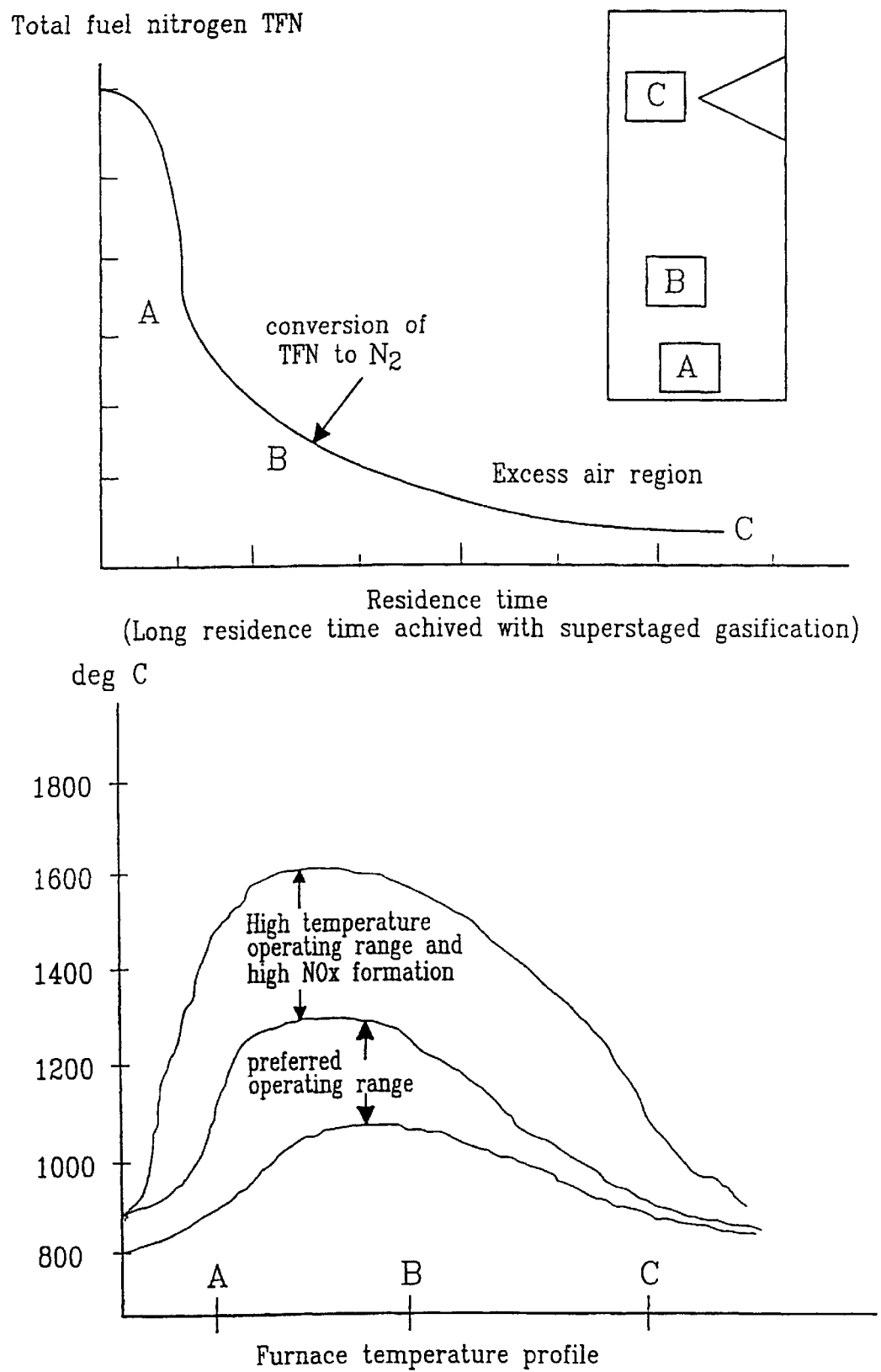

The positive effect of raising the oxygen content and employing the super staged gasification with a more pronounced reducing atmosphere in the lower furnace because of the lower air factor, as mentioned earlier is that fuel NOx emission can be reduced. Fuel NOx is primarily formed during the gasification and char burning stage of the combustion process. FIG. 4 shows schematically how fuel-N reactions in black liquor combustion processes take place. The fuel bound nitrogen is released during the gasification (pyrolysis) phase and forms amines, mainly ammoniac, and in an oxidizing high temperature atmosphere the ammoniac is being oxidized to nitrogen oxide. This condition would occur if oxygen enriched air is replacing "plain air" without any further compensation of removing air (oxygen) to a higher elevation in the boiler. By employing the super staged gasification where oxygen from the air is redistributed to a higher level in the furnace (above the liquor sprayers) a more staged combustion takes place as described previously and a reducing fuel enriched atmosphere in the lower furnace is created. The fuel rich gas conditions formed under substoichiometric pyrolysis conditions should be maintained as long as possible (super staged) before it meets the overfire air for complete combustion. In this way the fuel bound nitrogen has got time to get converted to free nitrogen gas (see FIG. 5) since the ammoniac molecule is thermodynamically unstable at reducing conditions during the the temperature levels we are dealing with, the ammoniac molecule simply decomposes to free nitrogen gas ($N_2$) and hydrogen ($H_2$). It should be noted that in the lower curve of FIG. 5 a "high" temperature favors the formation of NOx through the reaction $NH_3+O_2$ giving i.a. $NO+H_2O$ in spite of that the temperature is still below where thermal NOx is formed, i.e. a high temperature in the lower furnace generates NOx formation but not through thermal NOx but through the reaction described above.

However it is inevitable that a certain amount of NOx is formed while in the fuel layer where the oxygen enriched air first meets the fuel, an overstoichiometric zone occurs. Due to the fuel rich gas that enters zone B (see FIG. 4), where it meets overfire air, a reburning effect however takes place, which reduces the NOx-slip to a minimum.

Although the super staged gasification is more suitable for existing recovery boilers where a physical constraint already exists, it can also be applied to new recovery boilers, in that they can be built smaller for a given load compared to recovery boilers operating with "plain air".

Another benefit of using oxygen enriched air in the lower furnace and especially the primary air level is that the shutdown procedure of a boiler can be made faster and simpler because the increased oxygen content will increase the combustion rate of the residual char.

The need for and benefit of also enriching air levels with oxygen in the upper furnace in addition to what was mentioned earlier is that costly retrofits of these air levels can be minimized since the increase in volume due to redistribution of air from the lower furnace at higher loads can be reduced. Otherwise more airports and higher fan capacity would be needed.

To fully utilize the benefit of the oxygene enriched air in the lower furnace and to maintain a good penetration into the furnace the pressure in the windbox could be increased.

What is claimed is:

1. A method for black liquor gasification in a recovery boiler comprising a lower furnace and an upper furnace, black liquor sprayers for introducing black liquor in the boiler above the lower furnace and a number of combustion air levels, comprising the steps of adding oxygen enriched air to the combustion air or directly into the lower furnace at at least one air level underneath the liquor sprayers to gasify the black liquor and reducing the volume of combustion air fed into the lower furnace so as to have a substoichiometric condition and reduce upward gas velocity underneath the black liquor sprayers based on a constant supply of black liquor into the boiler, wherein the added oxygen and reduced volume of combustion air in the lower furnace substantially reduce the air factor in the lower furnace to a range of about 0.5–0.7 so as to substantially maintain a constant combustion temperature for emission control.

2. A method as claimed in claim 1, characterized in reducing the energy need in the lower furnace by lowering ballast in the form of nitrogen contained in the redistributed normal combustion air, and creating improved combustion characteristics in the upper furnace by introducing this redistributed combustion air therein, the significant reduction of upward gas velocity underneath the liquor sprayers thereby permitting more black liquor to be burnt up to the level where carry-over of black liquor droplets, smelt, char, etcetera becomes the bottleneck of the boiler.

3. A method as claimed in claim 2, characterized in creating in the lower furnace a substochiometric zone with reducing conditions and temperature control to decompose ammoniac formed under the drying phase, pyrolysis and gasification phase, and char/smelt burning phase into free nitrogen gas ($N_2$) and hydrogen.

4. A method as claimed in claim 2, characterized in superstaging distribution of oxygen from air in the lower furnace and from oxygen enriched air added to the upper furnace for maintaining reducing conditions in an air level above the black liquor sprayers and a reburning combustion in a higher elevated air level to create sufficient residence time for ammoniac molecule created from the combustion air to decompose into free nitrogen and to reduce the small amount of NOx still existing in the reburning zone.

5. A method as claimed in claim 1, characterized in applying it to a new recovery boiler, which thereby can be made more compact than a recovery boiler using only normal combustion air, and still achieve higher capacity and lower emissions.

6. A method as claimed in claim 1, characterized in enriching all air levels in the upper furnace with oxygen enriched air in addition to what is set forth in claim 1, thereby causing reduction of the gas velocity entering the superheater sections and the inlet to a precipitator in order to minimize the risk of impingement/plugging of heating surfaces and detonation of the collection efficiency of the precipitator, respectively.

7. A method as claimed claim 1, characterized in reducing the air volume by enriching all air levels in the upper furnace and thereby reducing the need for additional air openings in the pressure part, which otherwise would have been needed to facilitate super staged gasification.

8. A method as claimed in claim 1, characterized in enriching all air levels in the lower furnace with oxygen during boiler shutdown procedure for increasing the char burning rate and shortening the time needed for burning out the bed.

9. The method according to claim 1 further comprising the step of increasing oxygen in the upper furnace.

10. The method according to claim 9 wherein the step of increasing oxygen in the upper furnace comprises increasing the volume of combustion air in the furnace.

11. The method according to claim 1 wherein the steps of reducing the volume of combustion air in the lower furnace and increasing the oxygen in the upper furnace effect a redistribution of oxygen from the lower furnace to the upper furnace.

* * * * *